(12) United States Patent
Cheng

(10) Patent No.: US 9,477,747 B2
(45) Date of Patent: Oct. 25, 2016

(54) METHOD AND APPARATUS FOR ACQUIRING HOT TOPICS

(71) Applicant: TENCENT TECHNOLOGY (SHENZHEN) COMPANY LIMITED, Shenzhen (CN)

(72) Inventor: Gang Cheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 235 days.

(21) Appl. No.: 14/281,875

(22) Filed: May 19, 2014

(65) Prior Publication Data

US 2014/0280242 A1   Sep. 18, 2014

Related U.S. Application Data

(63) Continuation of application No. PCT/CN2013/090578, filed on Dec. 26, 2013.

(30) Foreign Application Priority Data

Feb. 25, 2013  (CN) .......................... 2013 1 0058887

(51) Int. Cl.
  *G06F 7/00* (2006.01)
  *G06F 17/30* (2006.01)
(52) U.S. Cl.
  CPC .............................. *G06F 17/30663* (2013.01)

(58) Field of Classification Search
  CPC ................................................. G06F 17/30663
  USPC ........................................................... 707/738
  See application file for complete search history.

(56) References Cited

U.S. PATENT DOCUMENTS

| | | | |
|---|---|---|---|
| 2002/0169762 A1* | 11/2002 | Cardona | G06F 17/3043 |
| 2003/0033333 A1* | 2/2003 | Nishino | G06F 17/30884 715/255 |
| 2007/0143278 A1 | 6/2007 | Srivastava | |
| 2011/0137906 A1 | 6/2011 | Cai | |

FOREIGN PATENT DOCUMENTS

| | | |
|---|---|---|
| CN | 101751458 A | 6/2010 |
| CN | 101980199 A | 2/2011 |

OTHER PUBLICATIONS

International Search Report in international application No. PCT/CN2013/090578, mailed on Apr. 3, 2014.

* cited by examiner

*Primary Examiner* — Van Oberly
(74) *Attorney, Agent, or Firm* — Syncoda LLP; Feng Ma; Junjie Feng

(57) ABSTRACT

A method includes: a first word set is acquired from community data within a period; words are selected from the first word set according to a frequency that each word of the first word set appears in the community data during a first group of days, the selected words are determined as hot words and form a second word set, wherein the first group of days are a plurality of days backward from a designated day; and topics are selected from a community topic set according to the second word set, and are determined as hot topics.

18 Claims, 6 Drawing Sheets

```
                                    ②
                                    │
                                    ▼
```

20731 for a topic contained in the community topic set, words involved in the topic are obtained from word subsets, a word subset containing the greatest number of words involved in the topic is picked out.

20732 a first hot degree component of the topic is calculated according to hot degrees of words which are contained in the picked out word subset and matched with the topic

20733 a second hot degree component of the topic is calculated according to the hot degrees of words which are contained in the picked out word subset and unmatched with the topic

20734 words which are involved in the topic and are contained in the second word set are chosen to form a fourth word set, words contained in the fourth word set but not contained in the picked out word subset are chosen to form a fifth word set, and then a third hot degree component of the topic is calculated according to hot degrees of all words contained in the fifth word set

20735 the hot degree of the topic is calculated according to the first hot degree component, the second hot degree component and the third hot degree component of the topic

2074 a preset number of topics with top hot degrees are selected from the community topic set to serve as hot topics; alternatively, topics with respective hot degrees greater than a third preset hot degree are selected from the community topic set to serve as hot topics

Fig. 2C

METHOD AND APPARATUS FOR ACQUIRING HOT TOPICS

CROSS REFERENCE TO RELATED APPLICATIONS

This is a continuation application of International Patent Application No. PCT/CN2013/090578, filed on Dec. 26, 2013, which claims priority to Chinese Patent Application No. 201310058887.5 filed on Feb. 25, 2013, the disclosures of both applications being incorporated by reference herein in their entirety.

TECHNICAL FIELD

In various embodiments, the present disclosure relates to the field of Internet, and in particular to a computer-implemented method for acquiring hot topics, and an associated apparatus.

BACKGROUND

Technologies that enable communications between users (e.g., posting a topic, reviewing or talking about a common topic) have become prevalent in recent years. Generally, in order to make users reach hot topics (such as sudden hot events or topics of high activity) easily, community managers place the hot topics in the navigation bar of the community homepage, so that users, when entering the homepage, can click a link of a hot topic on the homepage, then enters the page of hot topic and review it.

Conventionally, the hot topics are collected manually. Community managers first inquire the traffic of news on websites or traffic of topics in communities, then based on which determine hot topics. However, such manual collection of hot topics consumes a lot of human resources, and is less accurate and prompt at the hot topics mining.

SUMMARY

The embodiments of the present disclosure provide a method and apparatus for acquiring hot topics.

According to an aspect of the present disclosure, a method for acquiring hot topics includes:

at a computing device having one or more processors and memory for storing one or more programs to be executed by the one or more processors, a first word set is acquired from community data within a period;

words are selected from the first word set according to a frequency that each word of the first word set appears in the community data during a first group of days, the selected words are determined as hot words and form a second word set, wherein the first group of days are a plurality of days backward from a designated day; and topics are selected from a community topic set according to the second word set, and determining the selected topics as hot topics.

According to another aspect of the present disclosure, an apparatus for acquiring hot topics includes:

a first acquisition module, configured to acquire a first word set from community data within a period;

a first selection module, configured to select words from the first word set according to a frequency that each word of the first word set appears in the community data during a first group of days, and to determine the selected words as hot words and form the selected words into a second word set, wherein the first group of days are a plurality of days backward from a designated day; and a second selection module, configured to select topics from a community topic set according to the second word set, and to determine the selected topics as hot topics.

In some examples, the community data include at least one of the following: articles on micro-blogs, keywords on search engines, news headlines, and community topics.

In the embodiments, hot words can be acquired from community data which are collected periodically, and hot topics are selected based on the hot words within a period (for example, a current or latest period), thus overcoming the defect in the conventional art that the manual collection of hot topics is poor at accuracy and timeliness, and improving the timeliness of acquisition of hot topics.

BRIEF DESCRIPTION OF THE DRAWINGS

In the following, the embodiments will be discussed with reference to the figures. It should be understood that the drawings illustrate generally, by way of example, but not by way of limitation, various embodiments discussed in the present document.

FIGS. 2A, 2B, and 2C illustrate generally a process of a method for acquiring hot topics according to a second embodiment of the present disclosure.

DETAILED DESCRIPTION

The embodiments of the present disclosure are elaborated in combination with the figures below in detail, so as to manifest the objective, technical solution and advantage of the present disclosure.

First Embodiment

Figure 1:
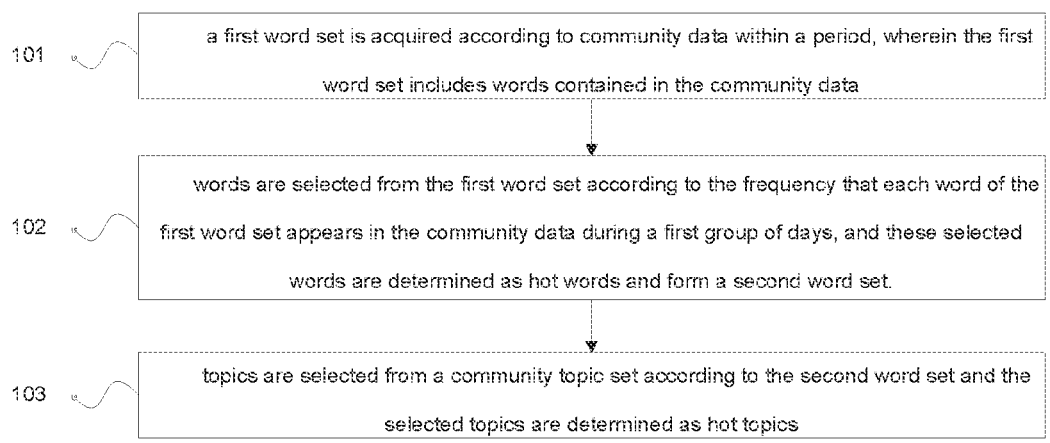
FIG. 1 illustrates generally a process of a method for acquiring hot topics according to a first embodiment of the present disclosure.

In FIG. 1, a method for acquiring hot topics according to the first embodiment of the present disclosure is provided and is elaborated as follows.

At step 101, a first word set is acquired according to community data within a period. The first word set includes words contained in the community data. In some examples, the community data include at least one of the following: articles on micro-blogs, keywords on search engines, news headlines, and community topics.

At step 102, words are selected from the first word set according to the frequency that each word of the first word set appears in the community data during a first group of days. These selected words are determined as hot words, and form a second word set. In some examples, the first group of days are a plurality of recent days backward from a designated day. The designated day may be a day on which the method for acquiring hot topics is implemented, for example today.

At step 103, topics are selected from a community topic set according to the second word set and the selected topics are determined as hot topics.

In some examples, the determined hot topics are presented on pages of websites. Users can review these hot topics through for example their PCs or mobile phones, or other client devices.

In the present embodiment, hot words are acquired from the community data which are collected periodically, and hot topics are selected based on the hot words within a period (for example, a current or latest period), thus overcoming the defect in the conventional art that the manual collection of hot topics is poor at accuracy and timeliness, and improving the timeliness of acquisition of hot topics.

Second Embodiment

The second embodiment provides another method for acquiring hot topics.

In this embodiment, before the method for acquiring hot topics is implemented, it is necessary to acquire, through data mining, words which have a same meaning or similar meanings, so as to form a word tree. Data mining is performed on numerous texts to get, but no limited to, words which have similar meanings, words which have a same meaning and words which are related to each other. According to their categories, all of these words are converged respectively, for example through a clustering algorithm to form a knowledge base.

In an example, "fixed" and "immobile", "smart" and "clever" show words which have similar meanings. In another example, "US" and "United States" show words which have the same meaning. Words which are related to each other refer to, for example, parent-child words, or brotherhood words, etc. In an example, "fruit tree" and "apple tree" are standing for the parent-child words. Brotherhood words are under a same parent. For example, "apple tree" and "pear tree" are under the "fruit tree", and they are brotherhood words.

There are three ways for semantic tree mining.

First Way

High frequency of co-occurrence is a common method for knowledge graph mining.

It is calculated the frequency of the co-occurrence of words A1 and A2 in a single text window. The single text window may be a single article among a great number of articles (for example, one hundred thousand articles). The probability of the co-occurrence of words A1 and A2 may be calculated by the following formula.

$P(A1,A2)$=(the amount of articles containing both $A1$ and $A2$)/(the amount of articles containing $A1$+the amount of articles containing $A2$)

A1 and A2 are considered as related words when $P(A1, A2) > \alpha$, where $\alpha$ is a threshold belonging to $0 < \alpha \le 1$.

Second Way

In this second way, the similarity of two words is calculated. In some examples, the similarity of two words is represented by the cosine of eigenvectors of two words. The cosine of eigenvectors of two words A1 and A2 may be calculated by the following formula.

$R(A1,A2)$=$\cos(V1,V2)$, where $V1$ is the eigenvector of $A1$ and $V2$ is the eigenvector of $A2$.

A1 and A2 are considered as related words when $R(A1, A2) > \beta$, where $\beta$ is a threshold belonging to $0 < \beta \le 1$.

The eigenvector of a word can be extracted through various methods. For example, a word contained in a context may be used as the eigenvector. In other examples, the ID of a file where the word is located may be used as the eigenvector. In further examples, the attribute or the origination of the file may be used as the eigenvector. It can be appreciated that the examples of extraction of the eigenvector of a word described herein are only for example not for limitation.

Third Way

In the third way, the Linear Discriminant Analysis (LDA) model may be employed. Also, the open source of the LDA can be employed directly. In some examples, the LDA-based semantic tree is modelled offline and then is used online. In other examples, the semantic tree is calculated out through the LDA online.

Through the above three ways, either alone or in their combination, we can get relationships of various words, which then are gathered to form a word tree. In the word tree, the relation of related words is established for example by their similarity. In some examples, the similarity is represented by a numerical value.

Figure 2A:
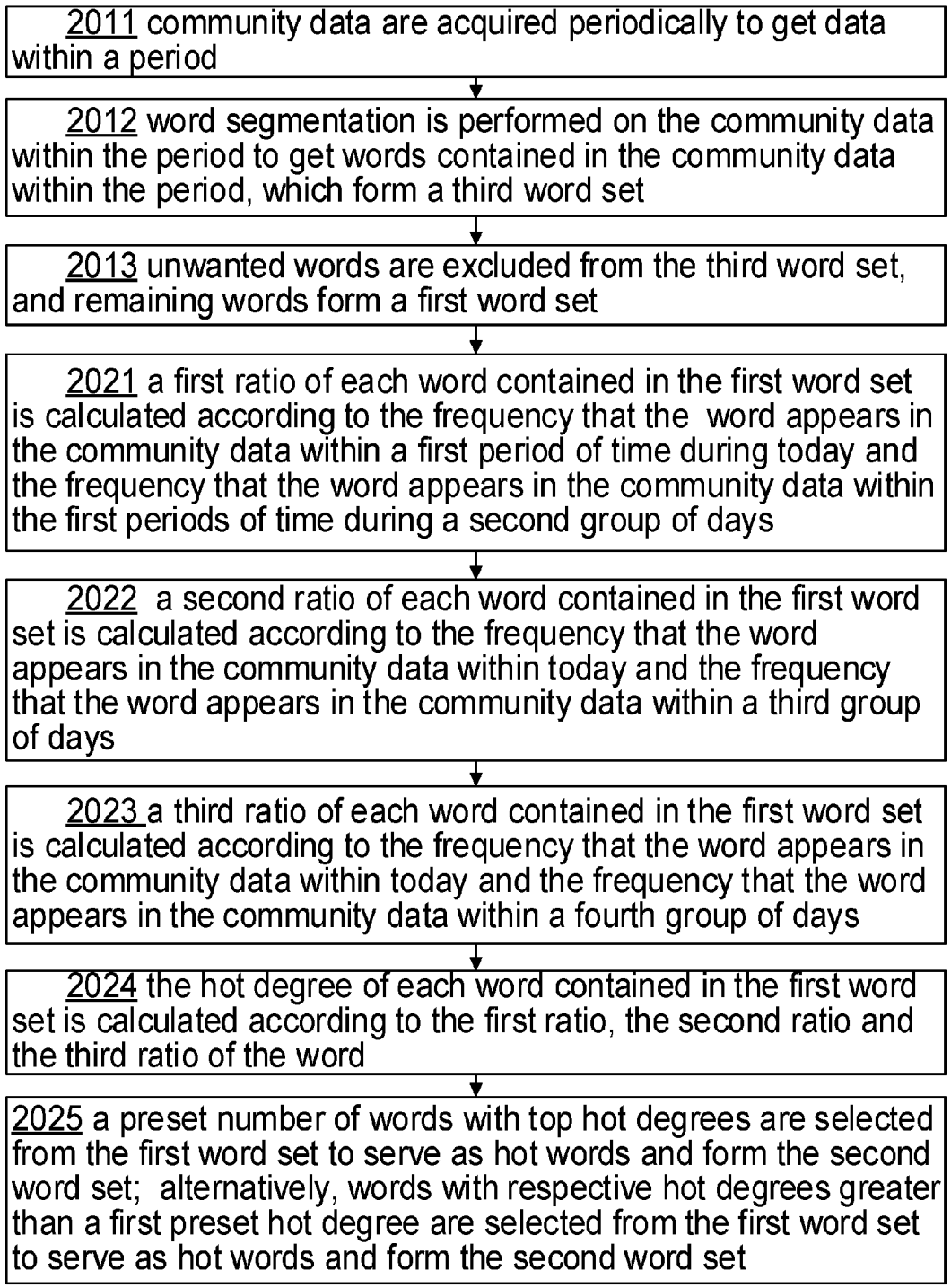
Figure 2B:
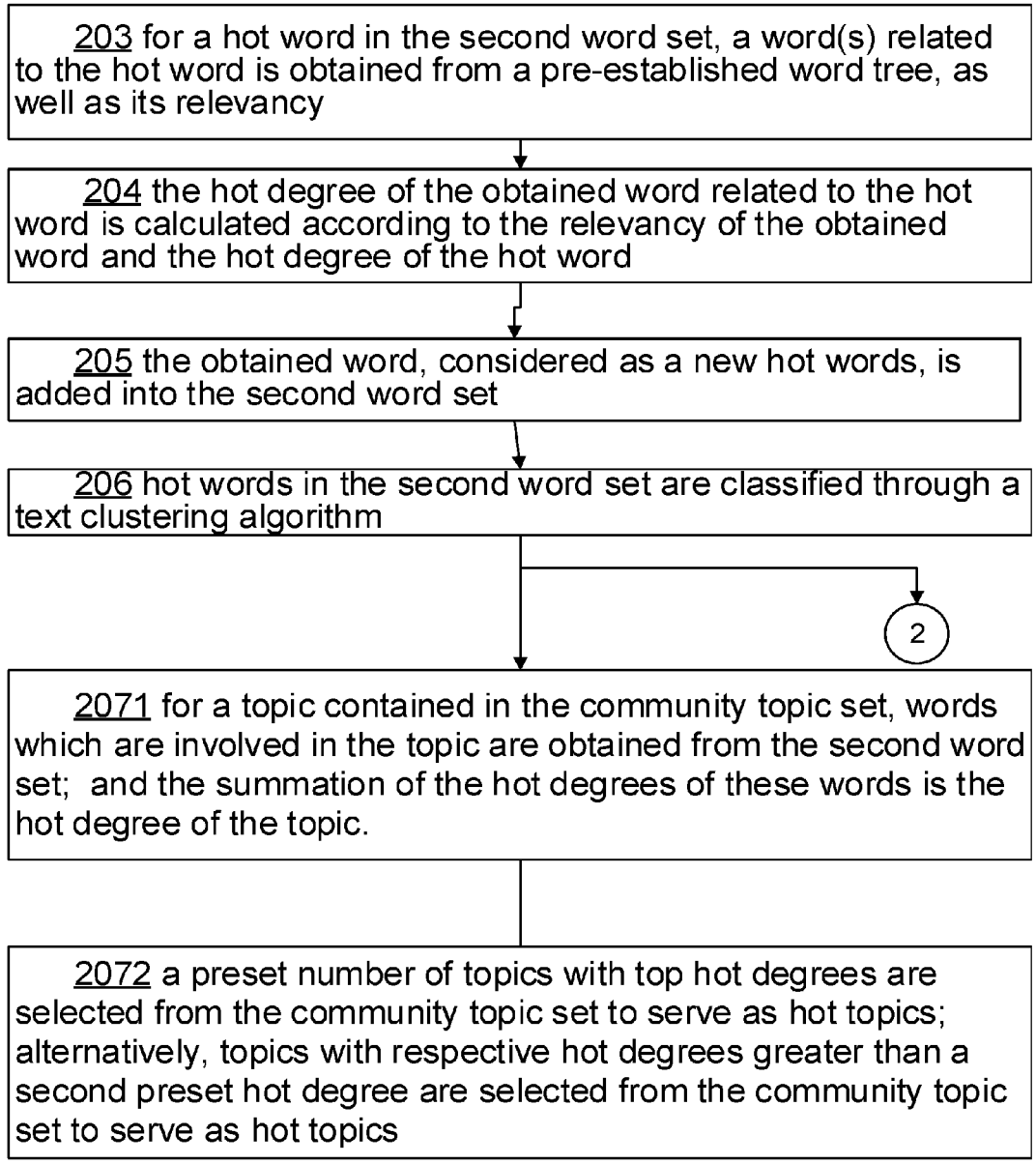

After the word tree is set up, the method for acquiring hot topics according to the second embodiment is implemented, as shown in FIGS. 2A, 2B, and 2C.

At step 201, a first word set is acquired according to community data within a period. The first word set includes words contained in the community data. In some examples, the community data includes at least one of the following: articles on micro-blogs, keywords on search engines, news headlines, and community topics.

In some examples, step 201 includes steps 2011-2013.

At step 2011, the community data are acquired periodically. For example, the community data are those data within one period.

At step 2012, word segmentation is performed on the community data within a period to get words contained in the community data within the period. These words form a third word set.

In some examples, the word segmentation is performed on phases and sentences in the community data based on preset word packages, so as to get the words contained in the community data within a period.

At step 2013, unwanted words are excluded from the third word set, and remaining words form a first word set.

Unwanted words include, but not limited to adverbs, auxiliary words, bad languages, erotic words, and politically sensitive words. The unwanted words form a group of words which should be filtered. The group of unwanted words is for example preset manually.

At step 202, words are selected from the first word set according to the frequency that each word of the first word set appears in the community data during a first group of days. These selected words are determined as hot words, and form a second word set. In some examples, the first group of days are a plurality of recent days backward from a designated day. The following will be discussed with today as the example of the designated day. And the first group of days are a plurality of recent days backward from today.

In some examples, a hot word is determined according to its hot degree. In some examples, the hot degree is dependent on the frequency that a word appears in current data and the frequency of the word appears in history data.

In some examples, step 202 includes steps 2021-2025.

At step 2021, a first ratio of each word contained in the first word set is calculated. The first ratio is calculated according to the frequency that a word appears in the community data within a first period of time during today and the frequency that the word appears in the community data within the first periods of time during a second group of days. The second group of days are selected from the first group of days and does not include today.

Step 2021 may include the following steps 20211-20212.

At step 20211, the second group of days is selected from the first group of days and the second group of days does not include today. The frequency that each word appears in the community data within the first period of time during each day contained in the second group of days is calculated, which is then used together with the number of days contained in the second group of days to calculate a first average frequency of each word of the first word set.

The frequency that a word appears in the community data within the first period of time of each day contained in the second group of days is calculated. Then the frequencies with respect to all day contained in the second group of days are summed into a total number. The total number is then averaged to the first average frequency.

For example, the first group of days may be two recent months backward from today, the second group of days may be several successive days within the first group of days, and the first period of time may be 10:00 am to 11:00 am of each day. The history data may be those community data from 10:00 am to 11:00 am during each day of the second group of days.

At step 20212, the first ratio of each word contained in the first word set is calculated according to the first average frequency of the word and the frequency that the word appears in the community data within the first period of time of today.

In some examples, the first ratio H_recent is calculated by the following formula:

$$H\_recent = \frac{h\_qv}{\frac{\sum_{i=1}^{n} h\_qv(i)}{n}},$$

where h_qv(i) is the frequency that a word appears in the community data within the first period of time during the day i contained in the second group of days, h_qv is the frequency that the word appears in the community data within the first period of time during today, and n is the number of days contained in the second group of days.

As can be appreciated, $$\frac{\sum_{i=1}^{n} h\_qv(i)}{n}$$

is the first average frequency mentioned in step 20211.

At step 2022, it is determined what day is it today, for example Monday, Tuesday and etc. A second ratio of each word contained in the first word set is calculated. The second ratio is calculated according to the frequency that a word appears in the community data within today and the frequency that the word appears in the community data within a third group of days. The third group of days are selected from the first group of days, and consists of days which are of the same day of a week as today. For example, assuming today—May 30, 2012—is Thursday, then May 23, 2012, May 16, 2012, May 9, 2012 and May 2, 2013, which are all Thursdays, form the third group of days. As can be appreciated, the third group of days does not include today.

Step 2022 may include the following steps 20221-20222.

At step 20221, a second average frequency of each word contained in the first word set is calculated. The frequency that a word appears in the community data within each day contained in the third group of days is calculated, which is then used together with the quantity of days forming the third group to calculate the second average frequency of the word.

For example, the first group of days may be two recent months backward from today, days which are of the same day of a week as today, are selected from the first group of days to form the third group of days. The community data within the third group of days are taken as history data, which are used together with the number of days forming the third group to calculate the second average frequency.

At step 20222, the second ratio of each word contained in the first word set is calculated according to the second average frequency of the word and the frequency that the word appears in the community data within today.

In some examples, the second ratio W_recent is calculated by the following formula:

$$W\_recent = \frac{d\_qv}{\frac{\sum_{i=1}^{m} qv(i)}{m}},$$

where qv(i) is the frequency that a word appears in the community data within the day i contained in the third group of days, d_qv is the frequency that the word appears in the community data within today, and m is the number of days contained in the third group of days. The day i is of a same day of a week as today.

As can be appreciated, $$\frac{\sum_{i=1}^{m} qv(i)}{m}$$

is the second average frequency mentioned in step 20221.

At step 2023, a fourth group of days is selected from the first group of days. A third ratio of each word contained in the first word set is calculated. The third ratio is calculated according to the frequency that a word appears in the community data within today and the frequency that the word appears in the community data within the fourth group of days. The fourth group of days is selected from the first group of days and may consist of a plurality of successive days. The fourth group of days does not include today.

Step 2023 may include the following steps 20231-20232.

At step 20231, a fourth group of days is selected from the first group of days and the fourth group of days does not include today. The frequency that each word appears in the community data within each day contained the fourth group of days is calculated, which is then used together with the number of days contained in the fourth group of days to calculate a third average frequency of each word contained in the first word set.

For example, the first group of days may be two recent successive months backward from today, the fourth group of days are a plurality of successive days selected from the two recent months backward from today. The community data within all days contained in the fourth group of days are taken as history data.

At step 20232, the third ratio of each word contained in the first word set is calculated according to the third average frequency of the word and the frequency that the word appears in the community data within today.

In some examples, the third ratio A_recent is calculated by the following formula:

$$A\_recent = \frac{d\_qv}{\frac{\sum_{i=1}^{L} qv(i)}{L}},$$

where qv(i) is the frequency that a word appears in the community data within the day i contained in the fourth group of days, d_qv is the frequency that the word appears in the community data within today, and L is the number of days contained in the fourth group of days.

As can be appreciated, $$\frac{\sum_{i=1}^{L} qv(i)}{L}$$

is the third average frequency mentioned in step 20231.

At step 2024, the hot degree of each word contained in the first word set is calculated according to the first ratio, the second ratio and the third ratio of the word.

In some examples, the hot degree of a word X is calculated by the following formula:

Recency(X)=$\alpha_1$*H_recent+$\beta_1$*W_recent+ $\gamma_1$*A_recent, where $\alpha_1$, $\beta_1$, $\gamma_1$ are coefficients, and $\alpha_1+\beta_1\gamma_1=1$. In some examples, $\alpha_1$, $\beta_1$ or $\gamma_1$ may be preset according to actual requirements.

At step 2025, words with top hot degrees are selected from the first word set to form the second word set. The words with top hot degrees are determined as hot words, and the quantity of the words with top hot degrees is equal to a first preset threshold. Alternatively, words with respective hot degrees greater than a first preset hot degree are selected from the first word set to be determined as hot words and to form the second word set.

In some examples, hot degrees of all words contained in the first word set are sequenced after they are calculated out. Then words with top hot degrees are selected from the first word set to form the second word set. The quantity of the words with top hot degrees is equal to the first preset threshold. Alternatively, words with respective hot degrees greater than the first preset hot degree are selected to form the second word set.

After step 202, the method of the second embodiment may include steps 203-206, thus enriching the second word set.

At step 203, for a hot word in the second word set, a word(s) related to the hot word is obtained from a pre-established word tree. Also the relevancy of the word related to the hot word is obtained from the pre-established word tree.

The word tree is pre-established, for example through a text clustering algorithm. The word tree may be pre-established according to a way as described at the beginning part of this second embodiment.

At step 204, the hot degree of the obtained word related to the hot word is calculated according to the relevancy of the obtained word related to the hot word and the hot degree of the hot word.

In some examples, the relevancy of the obtained word related to the hot word is multiplied by the hot degree of the hot word, so as to get the hot degree of the obtained word related to the hot word.

Given that the hot degree of the word A is 10, and the word B related to the hot word A has a relevancy of 0.8, the hot degree of the word B is 10*0.8=8.

At step 205, the word related to the hot word contained in the second word set, obtained from the pre-established word tree, is added into the second word set. The added word is also taken as a hot word.

Steps 203-204 are also executed for other hot words in the second word set, so as to get their respective related words from the pre-established word tree, which are then added to the second word set. All the added words are considered as hot words.

At step 206, hot words in the second word set are classified through a text clustering algorithm.

In some examples, according to their correlations with each other, hot words in the second word set are classified into a plurality of word subsets.

At step 207, topics are selected from a community topic set according to the second word set, and the selected topics are determined as hot topics.

The hot topics can be determined through, for example, two approaches. In one approach, hot topics are determined in the case where words contained in the second word set are not clustered. In another approach, hot topics are determined in the case where words contained in the second word set are clustered according to their relation with other words. After being clustered, word subsets are formed.

In the case where words contained in the second word set are not clustered, step 207 may include the following steps 2071-2072.

At step 2071, for a topic contained in the community topic set, words which are involved in the topic are obtained from the second word set. The summation of the hot degrees of these words is the hot degree of the topic.

In some examples, the hot degree of the topic Match_score(topic$_k$) is calculated by the following formula:

$$\text{Match\_score}(topic_k) = \sum_{j=1}^{Y} \text{match}(\text{Hot\_score}(j)),$$

where topic$_k$ is a topic numbering K in the community topic set, match(hot_score(j)) is the hot degree Hot_score(j) of a word j which is obtained from the second word set and is matched with the topic$_k$, Y is the quantity of words which are obtained from the second word set and are matched with the topic$_k$. The hot degrees of all the words which are obtained from the second word set and are matched with the topic are added up, obtaining the hot degree of the topic.

At step 2072, topics with top hot degrees are selected from the community topic set to be determined as hot topics. The quantity of the topics with top hot degrees is equal to a second preset threshold. Alternatively, topics with respective hot degrees greater than a second preset hot degree are selected from the community topic set to be determined as hot topics.

In the case where words contained in the second word set are clustered, step 207 may include the following steps 2073-2074. After clustered, the second word set is comprised of word subsets.

At step 2073, the hot degree of each topic contained in the community topic set is calculated according to hot degrees of hot words contained in the second word set.

Step 2073 may include steps 20731-20735.

At step 20731, for a topic contained in the community topic set, words involved in the topic are obtained from word subsets. A word subset containing the maximum number of words involved in the topic is picked out.

Match is performed between the topic and words contained in all word subsets. A word subset which contains the greatest number of matched words is picked out.

For example, a topic contains words {A, B, C, D, E, F, G, H, I}, there are following word subsets {A, B, C}, {X, Y, Z, D, E} and {M, N, F, G, H, I} after the second word set is classified according to the text clustering algorithm. Match is performed between {A, B, C, D, E, F, G, H, I} and the three word subsets. After matching, it is determined that {A, B, C, D, E, F, G, H, I} has the same words A, B and C as the subset {A, B, C}, {A, B, C, D, E, F, G, H, I} has the same words D and E as the subset {X, Y, Z, D, E}, and {A, B, C, D, E, F, G, H, I} has the same words F, G, H and I as the subset {M, N, F, G, H, I}. Thus, the subset {M, N, F, G, H, I}, which has the greatest number of matched words, is used to calculate the hot degree of the topic containing words {A, B, C, D, E, F, G, H, I}.

At step 20732, a first hot degree component of the topic is calculated according to hot degrees of words which are contained in the picked out word subset and matched with the topic.

The first hot degree component Match_score($topic_k$) may be calculated by the following formula:

$$\text{Match\_score}(topic_k) = \sum_{j=1}^{z1} \text{match}(\text{Hot\_score}(j)),$$

where $topic_k$ is a topic numbering K in the community topic set, match(hot_score(j)) is the hot degree Hot_score(j) of a word j which is contained in the picked out word subset and is matched with the $topic_k$, $z1$ is the quantity of words which are contained in the picked out word subset and are matched with the $topic_k$. The hot degrees of all the words which are contained in the picked out word subset and are matched with the topic are added up, obtaining the first hot degree component of the topic.

Continuing the example in step 20731, the summation of hot degrees of F, G, H and I contained in the subset {M, N, F, G, H, I} is calculated.

At step 20733, a second hot degree component of the topic is calculated according to the hot degrees of words which are contained in the picked out word subset and unmatched with the topic.

The second hot degree component lost_score($topic_k$) may be calculated by the following formula:

$$\text{lost\_score}(topic_k) = -\sum_{j=1}^{z2} \text{lost}(\text{Hot\_score}(j)),$$

where $topic_k$ is a topic numbering K in the community topic set, lost(hot_score(j)) is the hot degree of a word j which is contained in the picked out word subset and is unmatched with the $topic_k$, $z2$ is the quantity of words which are contained in the picked out word subset and are unmatched with the $topic_k$. The hot degrees of all the words which are contained in the picked out word subset and are unmatched with the topic are added up to get a value, and its negative value is taken as the second hot degree component of the topic.

Continuing the example in step 20731, the summation of hot degrees of M and N contained in the subset {M, N, F, G, H, I} is calculated, and then the negative value of the summation is taken as the second hot degree component of the topic.

At step 20734, words which are involved in the topic and are contained in the second word set are chosen to form a fourth word set. Words contained in the fourth word set but not contained in the picked out word subset are chosen to form a fifth word set. A third hot degree component of the topic is calculated according to hot degrees of all words contained in the fifth word set.

The third hot degree component surplus_score($topic_k$) may be calculated by the following formula:

$$\text{surplus\_score}(topic_k) = -\sum_{j=1}^{z3} \text{lost}(\text{Hot\_score}(j)),$$

where $topic_k$ is a topic numbering K in the community topic set, lost(hot_score(j)) is the hot degree of a word j which is contained in the fifth word set, $z3$ is the quantity of words which are contained in the fifth word set. The hot degrees of all the words which are contained in the fifth word set are added up to get a value, and its negative value is taken as the third hot degree component of the topic.

Continuing the example in step 20731, the summation of hot degrees of A, B, C, D and E of {A, B, C, D, E, F, G, H, I} is calculated, and then the negative value of the summation is taken as the third hot degree component of the topic.

At step 20735, the hot degree of the topic is calculated according to the first hot degree component, the second hot degree component and the third hot degree component of the topic.

The hot degree of the topic K may be calculated by the following formula: topic_score(k)=$\alpha_2$*Match_score(topick)+$\beta_2$*lost_score(topick)+$\gamma_2$*surplus_score(topick), where $\alpha_2$, $\beta_2$, $\gamma_2$ are coefficients, and $\alpha_2+\beta_2+\gamma_2=1$. In some examples, $\alpha_2$, $\beta_2$ or $\gamma_2$ may be preset according to actual requirements.

At step 2074, topics with top hot degrees are selected from the community topic set to be determined as hot topics. The quantity of the topics with top hot degrees is equal to a third preset threshold. Alternatively, topics with respective hot degrees greater than a third preset hot degree are selected from the community topic set to be determined as hot topics.

In some examples, the determined hot topics are presented on pages of websites.

Users can review these hot topics through for example their PCs or mobile phones, or other client devices.

In the present embodiment, hot words are acquired from the community data which are collected periodically, and hot topics are selected based on the hot words within a current period, thus overcoming the defect in the conventional art that the manual collection of hot topics is poor at accuracy and timeliness, and improving the timeliness of acquisition of hot topics.

Third Embodiment

Figure 3:
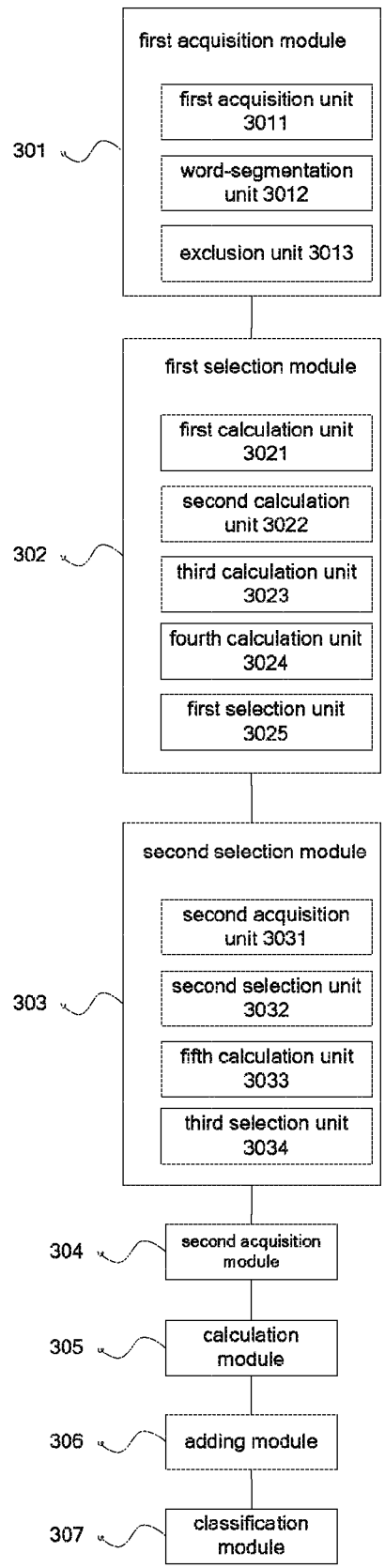
FIG. 3 illustrates generally a structure of an apparatus for acquiring hot topics according to a third embodiment of the present disclosure.

In FIG. 3, an apparatus for acquiring hot topics according to the first embodiment of the present disclosure is provided and includes a first acquisition module 301, a first selection module 302 and a second selection module 303.

The first acquisition module 301 is configured to acquire a first word set according to community data within a period. The first word set includes words contained in the community data. In some examples, the community data include at least one of the following: articles on micro-blogs, keywords on search engines, news headlines, and community topics.

The first selection module 302 is configured to select words from the first word set according to a frequency that each word of the first word set appears in the community data during a first group of days, and to determine the selected words as hot words and form the selected words into a second word set. In some examples, the first group of days are a plurality of recent successive days backward from a designated day.

The second selection module 303 is configured to select topics from a community topic set according to the second word set, and to determine the selected topics as hot topics.

In some examples, the first acquisition module 301 includes:

a first acquisition unit 3011, configured to acquire the community data periodically to get community data within a period;

a word-segmentation unit 3012, configured to perform word segmentation on the community data within the period to get words contained in the community data within the period, these words forming a third word set; and an exclusion unit 3013, configured to exclude a group of preset unwanted words from the third word set to obtain the first word set.

In some examples, the first selection module 302 includes:

a first calculation unit 3021, configured to calculate a first ratio of a word contained in the first word set according to a frequency that the word appears in the community data within a first period of time during the designated day and a frequency that the word appears in the community data within the first periods of time during a second group of days, wherein the second group of days are selected from the first group of days and does not include the designated day;

a second calculation unit 3022, configured to calculate a second ratio of the word contained in the first word set according to a frequency that the word appears in the community data within the designated day and a frequency that the word appears in the community data within a third group of days, wherein the third group of days are selected from the first group of days and consists of days which are of the same day of a week as the designated day, and wherein the third group of days does not include the designated day;

a third calculation unit 3023, configured to calculate a third ratio of the word contained in the first word set according to the frequency that the word appears in the community data within the designated day and a frequency that the word appears within a fourth group of days, wherein the fourth group of days are selected from the first group of days and does not include the designated day;

a fourth calculation unit 3024, configured to calculate a hot degree of the word contained in the first word set according to the first ratio, the second ratio and the third ratio of the word; and a first selection unit 3025, configured to determine words with top hot degrees in the first word set as hot words and form the hot words into the second word set, wherein the number of the words with top hot degrees in the first word set is equal to a first preset threshold, or configured to determine words with hot degrees greater than a first preset hot degree as hot words and form said hot words into the second word set.

In some examples, the first calculation unit 3021 includes:

a first calculation subunit 30211, configured to calculate a first average frequency of the word contained in the first word set according to the number of days contained in the second group of days and the frequency that the word appears in the community data within the first periods of time during the second group of days; and a second calculation subunit 30212, configured to calculate the first ratio of the word contained in the first word set according to the first average frequency of the word and the frequency that the word appears in the community data within the first period of time during the designated day.

In some examples, the second calculation unit 3022 includes:

a third calculation subunit 30221, configured to calculate a second average frequency of the word contained in the first word set according to the number of days contained in the third group of days and the frequency that the word appears in the community data within the third group of days; and a fourth calculation subunit 30222, configured to calculate the second ratio of the word contained in the first word set according to the second average frequency of the word and the frequency that the word appears in the community data within the designated day.

In some examples, the third calculation unit 3023 includes:

a fifth calculation subunit 30231, configured to calculate a third average frequency of the word contained in the first word set according to the number of days contained in the fourth group of days and the frequency that the word appears in the community data within the fourth group of days; and a sixth calculation subunit 30232, configured to calculate the third ratio of the word contained in the first word set according to the third average frequency of the word and the frequency that the word appears in the community data within the designated day.

In some examples, the apparatus further includes:

a second acquisition module 304, configured to acquire, from a pre-established word tree, words related to a hot word contained in the second word set and relevancies of the words related to the hot word contained in the second word set, wherein the word tree is pre-established through a text clustering algorithm;

a calculation module 305, configured to calculate hot degrees of the words related to the hot word contained in the second word set according to the relevancies of the words related to the hot word contained in the second word set and a hot degree of the hot word contained in the second word set;

an adding module 306, configured to add the acquired words related to the hot word contained in the second word set into the second word set; and a classification module 307, configured to classify, through a text clustering algorithm, words in the second word set into word subsets.

In some examples, the second selection module 303 includes:

a second acquisition unit 3031, configured to acquire words which are involved in a topic contained in the community topic set from the second word set, and to sum hot degrees of these words into a hot degree of the topic; and a second selection unit 3032, configured to determine topics with top hot degrees in the community topic set as hot topics, wherein the number of the topics with top hot degrees is equal to a second preset threshold, or configured to determine topics with hot degrees greater than a second preset hot degree in the community topic set as hot topics.

In some examples, the second selection module 303 includes:

a fifth calculation unit 3033, configured to calculate a hot degree of each topic contained in the community topic set according to hot degrees of hot words contained in the second word set; and a third selection unit 3034, configured to determine topics with top hot degrees in the community topic set as hot topics, wherein the number of the topics with top hot degrees is equal to a third preset threshold, or configured to determine topics with hot degrees greater than a third preset hot degree in the community topic set as hot topics.

In some examples, the fifth calculation unit 3033 includes:

an acquisition subunit 30331, configured to, for a topic contained in the community topic set, select a word subset which contains a maximum number of words involved in the topic;

a seventh calculation subunit 30332, configured to calculate a first hot degree component of the topic according to hot degrees of words which are contained in both the selected word subset and the topic itself;

an eighth calculation subunit 30333, configured to calculate a second hot degree component of the topic according to hot degrees of words which are contained in the selected word subset but not contained in the topic;

a ninth calculation subunit 30334, configured to select words which are involved in the topic and are contained in the second word set to form a fourth word set, to select words contained in the fourth word set but not contained in the selected word subset to form a fifth word set, and to calculate a third hot degree component of the topic according to hot degrees of words contained in the fifth word set; and a tenth calculation subunit 30335, configured to calculate the hot degree of the topic according to the first hot degree component, the second hot degree component and the third hot degree component of the topic.

In the present embodiment, hot words are acquired from the community data which are collected periodically, and hot topics are selected based on the hot words within a period (for example, a current or latest period), thus overcoming the defect in the conventional art that the manual collection of hot topics is poor at accuracy and timeliness, and improving the timeliness of acquisition of hot topics.

Figure 4:
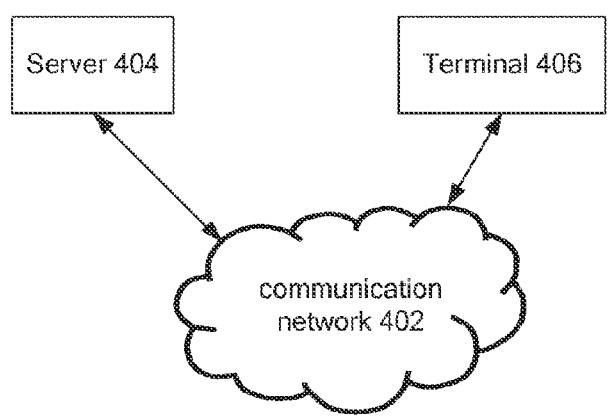
FIG. 4 illustrates generally an example environment incorporating certain disclosed embodiments.

FIG. 4 illustrates generally an example environment 400 incorporating example method and apparatus for acquiring hot topics in accordance with various disclosed embodiments. As shown in FIG. 4, the environment 400 can include a server 404, a terminal 406, and a communication network 402. The server 404 and the terminal 406 may be coupled through the communication network 402 for information exchange. In an example, the server 404 may determine a hot topic and, via the communication network 402 the hot topic is displayed on the terminal 406 for a user's view.

Although only one terminal 406 and one server 404 are shown in the environment 400, any number of terminals 406 or servers 404 may be included, and other devices may also be included.

The communication network 402 may include any appropriate type of communication network for providing network connections to the server 404 and terminal 406 or among multiple servers 404 or terminals 406. For example, the communication network 402 may include the Internet or other types of computer networks or telecommunication networks, either wired or wireless.

A terminal, as used herein, may refer to any appropriate user terminal with certain computing capabilities, e.g., a Personal Computer (PC), a work station computer, a hand-held computing device (e.g., a tablet), a mobile terminal (e.g., a mobile phone or a smart phone), or any other user-side computing device.

A server, as used herein, may refer to one or more server computers configured to provide certain server functionalities, e.g., acquiring hot topics, database management, etc. A server may also include one or more processors to execute computer programs in parallel.

Figure 5:
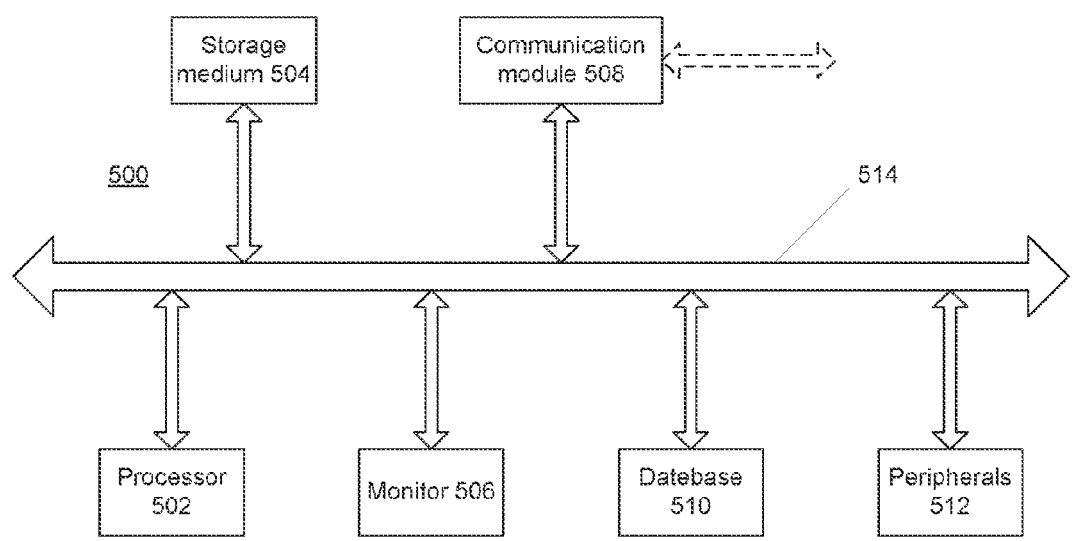
FIG. 5 illustrates generally an example computing system consistent with the disclosed embodiments.

The server 404 and the terminal 406 may be implemented on any appropriate computing platform. FIG. 5 shows a block diagram of an example computing system 500 capable of implementing the server 404 and/or the terminal 406. As shown in FIG. 5, the example computing system 500 may include a processor 502, a storage medium 504, a monitor 506, a communication module 508, a database 510, peripherals 512, and one or more bus 514 to couple the devices together. Certain devices may be omitted and other devices may be included.

The processor 502 may include any appropriate processor or processors. Further, the processor 502 may include multiple cores for multi-thread or parallel processing. The storage medium 504 (e.g. non-transitory computer-readable storage medium) may include memory modules, e.g., Read-Only Memory (ROM), flash memory modules, and mass storages, e.g., CD-ROM, U-disk, removable hard disk, etc. The storage medium 504 may store computer programs for implementing various processes (e.g., acquisition of hot topics, etc.), when executed by the processor 502.

The monitor 506 may include display devices for displaying contents and information generated by the computing system 500, e.g., displaying hot topics, displaying buttons for user to trigger certain functions, and/or other suitable operations. The peripherals 512 may include I/O devices such as keyboard, mouse, microphone, speaker, etc. for inputting information, triggering certain buttons shown on the monitor 506, and any other suitable functions.

Further, the communication module 508 may include network devices for establishing connections through the communication network 402. The database 510 may include one or more databases for storing certain data and for performing certain operations on the stored data, e.g., managing data, database searching, etc.

The present disclosure has been described with reference to some embodiments. However, it will be readily apparent to those skilled in the art that it is possible to embody disclosure in specific forms other than those of the embodiments described above. This may be done without departing from the scope of the disclosure. The embodiments are merely illustrative and should not be considered restrictive in any way.

The invention claimed is:

1. A method, comprising:
   at a computing device having one or more processors and memory for storing one or more programs to be executed by the one or more processors,
   acquiring a first word set from community data within a period;
   selecting words from the first word set according to a frequency that each word of the first word set appears in the community data during a first group of days, determining the selected words as hot words and forming the selected words into a second word set, wherein the first group of days are a plurality of days backward from a designated day; and selecting topics from a community topic set according to the second word set, and determining the selected topics as hot topics, wherein the selecting words from the first word set according to a frequency that each word of the first word set appears in the community data during a first group of days, determining the selected words as hot words and forming the selected words into a second word set, comprises:

calculating a first ratio of a word contained in the first word set according to a frequency that the word appears in the community data within a first period of time during the designated day and a frequency that the word appears in the community data within the first periods of time during a second group of days, wherein the second group of days are selected from the first group of days and does not comprise the designated day;

calculating a second ratio of the word contained in the first word set according to a frequency that the word appears in the community data within the designated day and a frequency that the word appears in the community data within a third group of days, wherein the third group of days are selected from the first group of days and consists of days which are of the same day of a week as the designated day, and wherein the third group of days does not comprise the designated day;

calculating a third ratio of the word contained in the first word set according to the frequency that the word appears in the community data within the designated day and a frequency that the word appears within a fourth group of days, wherein the fourth group of days are selected from the first group of days and does not comprise the designated day;

calculating a hot degree of the word contained in the first word set according to the first ratio, the second ratio and the third ratio of the word; and determining words with top hot degrees in the first word set as hot words and forming the hot words into the second word set, wherein the number of the words with top hot degrees in the first word set is equal to a first preset threshold, or determining words with hot degrees greater than a first preset hot degree as hot words and forming said hot words into the second word set.

2. The method according to claim 1, wherein the acquiring a first word set from community data within a period comprises:

acquiring the community data periodically to get community data within a period;

performing word segmentation on the community data within the period to get words contained in the community data within the period, these words forming a third word set; and excluding a group of preset unwanted words from the third word set to obtain the first word set.

3. The method according to claim 1, wherein the calculating a first ratio of a word contained in the first word set according to a frequency that the word appears in the community data within a first period of time during the designated day and a frequency that the word appears in the community data within the first periods of time during a second group of days, comprises:

calculating a first average frequency of the word contained in the first word set according to the number of days contained in the second group of days and the frequency that the word appears in the community data within the first periods of time during the second group of days; and calculating the first ratio of the word contained in the first word set according to the first average frequency of the word and the frequency that the word appears in the community data within the first period of time during the designated day.

4. The method according to claim 1, wherein the calculating a second ratio of the word contained in the first word set according to a frequency that the word appears in the community data within the designated day and a frequency that the word appears in the community data within a third group of days, comprises:

calculating a second average frequency of the word contained in the first word set according to the number of days contained in the third group of days and the frequency that the word appears in the community data within the third group of days; and calculating the second ratio of the word contained in the first word set according to the second average frequency of the word and the frequency that the word appears in the community data within the designated day.

5. The method according to claim 1, wherein the calculating a third ratio of the word contained in the first word set according to the frequency that the word appears in the community data within the designated day and a frequency that the word appears within a fourth group of days, comprises:

calculating a third average frequency of the word contained in the first word set according to the number of days contained in the fourth group of days and the frequency that the word appears in the community data within the fourth group of days; and calculating the third ratio of the word contained in the first word set according to the third average frequency of the word and the frequency that the word appears in the community data within the designated day.

6. The method according to claim 1, further comprising:

after the second word set is formed, from a pre-established word tree, acquiring words related to a hot word contained in the second word set and relevancies of the words related to the hot word contained in the second word set, wherein the word tree is pre-established through a text clustering algorithm;

calculating hot degrees of the words related to the hot word contained in the second word set according to the relevancies of the words related to the hot word contained in the second word set and a hot degree of the hot word contained in the second word set;

adding the acquired words related to the hot word contained in the second word set into the second word set; and classifying, through a text clustering algorithm, words in the second word set into word subsets.

7. The method according to claim 6, the selecting topics from a community topic set according to the second word set comprises:

calculating a hot degree of each topic contained in the community topic set according to hot degrees of hot words contained in the second word set; and determining topics with top hot degrees in the community topic set as hot topics, wherein the number of the topics with top hot degrees is equal to a third preset threshold, or determining topics with hot degrees greater than a third preset hot degree in the community topic set as hot topics.

8. The method according to claim 7, wherein the calculating a hot degree of each topic contained in the community topic set according to hot degrees of hot words contained in the second word set, comprises:
for a topic contained in the community topic set, selecting a word subset which contains a maximum number of words involved in the topic;
calculating a first hot degree component of the topic according to hot degrees of words which are contained in both the selected word subset and the topic itself;
calculating a second hot degree component of the topic according to hot degrees of words which are contained in the selected word subset but not contained in the topic;
selecting words which are involved in the topic and are contained in the second word set to form a fourth word set, selecting words contained in the fourth word set but not contained in the selected word subset to form a fifth word set, and calculating a third hot degree component of the topic according to hot degrees of words contained in the fifth word set; and
calculating the hot degree of the topic according to the first hot degree component, the second hot degree component and the third hot degree component of the topic.

9. The method according to claim 1, the selecting topics from a community topic set according to the second word set, and determining the selected topics as hot topics, comprises:
acquiring words which are involved in a topic contained in the community topic set from the second word set, summing hot degrees of these words into a hot degree of the topic; and
determining topics with top hot degrees in the community topic set as hot topics, wherein the number of the topics with top hot degrees is equal to a second preset threshold, or determining topics with hot degrees greater than a second preset hot degree in the community topic set as hot topics.

10. A non-transitory computer-readable storage medium storing instructions thereon for execution by one or more processors, the instructions comprising:
acquiring a first word set from community data within a period;
selecting words from the first word set according to a frequency that each word of the first word set appears in the community data during a first group of days, determining the selected words as hot words and forming the selected words into a second word set, wherein the first group of days are a plurality of days backward from a designated day; and
selecting topics from a community topic set according to the second word set, and determining the selected topics as hot topics,
wherein the selecting words from the first word set according to a frequency that each word of the first word set appears in the community data during a first group of days, determining the selected words as hot words and forming the selected words into a second word set, comprises:
calculating a first ratio of a word contained in the first word set according to a frequency that the word appears in the community data within a first period of time during the designated day and a frequency that the word appears in the community data within the first periods of time during a second group of days, wherein the second group of days are selected from the first group of days and does not comprise the designated day;
calculating a second ratio of the word contained in the first word set according to a frequency that the word appears in the community data within the designated day and a frequency that the word appears in the community data within a third group of days, wherein the third group of days are selected from the first group of days and consists of days which are of the same day of a week as the designated day, and wherein the third group of days does not comprise the designated day;
calculating a third ratio of the word contained in the first word set according to the frequency that the word appears in the community data within the designated day and a frequency that the word appears within a fourth group of days, wherein the fourth group of days are selected from the first group of days and does not comprise the designated day;
calculating a hot degree of the word contained in the first word set according to the first ratio, the second ratio and the third ratio of the word; and
determining words with top hot degrees in the first word set as hot words and forming the hot words into the second word set, wherein the number of the words with top hot degrees in the first word set is equal to a first preset threshold, or determining words with hot degrees greater than a first preset hot degree as hot words and forming said hot words into the second word set.

11. The non-transitory computer-readable storage medium according to claim 10, wherein the acquiring a first word set from community data within a period comprises:
acquiring the community data periodically to get community data within a period;
performing word segmentation on the community data within the period to get words contained in the community data within the period, these words forming a third word set; and
excluding a group of preset unwanted words from the third word set to obtain the first word set.

12. The non-transitory computer-readable storage medium according to claim 10, wherein the calculating a first ratio of a word contained in the first word set according to a frequency that the word appears in the community data within a first period of time during the designated day and a frequency that the word appears in the community data within the first periods of time during a second group of days, comprises:
calculating a first average frequency of the word contained in the first word set according to the number of days contained in the second group of days and the frequency that the word appears in the community data within the first periods of time during the second group of days; and
calculating the first ratio of the word contained in the first word set according to the first average frequency of the word and the frequency that the word appears in the community data within the first period of time during the designated day.

13. The non-transitory computer-readable storage medium according to claim 10, wherein the calculating a second ratio of the word contained in the first word set according to a frequency that the word appears in the community data within the designated day and a frequency that the word appears in the community data within a third group of days, comprises:
- calculating a second average frequency of the word contained in the first word set according to the number of days contained in the third group of days and the frequency that the word appears in the community data within the third group of days; and
- calculating the second ratio of the word contained in the first word set according to the second average frequency of the word and the frequency that the word appears in the community data within the designated day.

14. The non-transitory computer-readable storage medium according to claim 10, wherein the calculating a third ratio of the word contained in the first word set according to the frequency that the word appears in the community data within the designated day and a frequency that the word appears within a fourth group of days, comprises:
- calculating a third average frequency of the word contained in the first word set according to the number of days contained in the fourth group of days and the frequency that the word appears in the community data within the fourth group of days; and
- calculating the third ratio of the word contained in the first word set according to the third average frequency of the word and the frequency that the word appears in the community data within the designated day.

15. The non-transitory computer-readable storage medium according to claim 10, wherein the instructions further comprises:
- after the second word set is formed,
- from a pre-established word tree, acquiring words related to a hot word contained in the second word set and relevancies of the words related to the hot word contained in the second word set, wherein the word tree is pre-established through a text clustering algorithm;
- calculating hot degrees of the words related to the hot word contained in the second word set according to the relevancies of the words related to the hot word contained in the second word set and a hot degree of the hot word contained in the second word set;
- adding the acquired words related to the hot word contained in the second word set into the second word set; and
- classifying, through a text clustering algorithm, words in the second word set into word subsets.

16. The non-transitory computer-readable storage medium according to claim 15, the selecting topics from a community topic set according to the second word set comprises:
- calculating a hot degree of each topic contained in the community topic set according to hot degrees of hot words contained in the second word set; and
- determining topics with top hot degrees in the community topic set as hot topics, wherein the number of the topics with top hot degrees is equal to a third preset threshold, or determining topics with hot degrees greater than a third preset hot degree in the community topic set as hot topics.

17. The non-transitory computer-readable storage medium according to claim 16, wherein the calculating a hot degree of each topic contained in the community topic set according to hot degrees of hot words contained in the second word set, comprises:
- for a topic contained in the community topic set, selecting a word subset which contains a maximum number of words involved in the topic;
- calculating a first hot degree component of the topic according to hot degrees of words which are contained in both the selected word subset and the topic itself;
- calculating a second hot degree component of the topic according to hot degrees of words which are contained in the selected word subset but not contained in the topic;
- selecting words which are involved in the topic and are contained in the second word set to form a fourth word set, selecting words contained in the fourth word set but not contained in the selected word subset to form a fifth word set, and calculating a third hot degree component of the topic according to hot degrees of words contained in the fifth word set; and
- calculating the hot degree of the topic according to the first hot degree component, the second hot degree component and the third hot degree component of the topic.

18. The non-transitory computer-readable storage medium according to claim 10, the selecting topics from a community topic set according to the second word set, and determining the selected topics as hot topics, comprises:
- acquiring words which are involved in a topic contained in the community topic set from the second word set, summing hot degrees of these words into a hot degree of the topic; and
- determining topics with top hot degrees in the community topic set as hot topics, wherein the number of the topics with top hot degrees is equal to a second preset threshold, or determining topics with hot degrees greater than a second preset hot degree in the community topic set as hot topics.

* * * * *